United States Patent
Yukawa (10) Patent No.: US 11,457,452 B2
(45) Date of Patent: Sep. 27, 2022

(54) COMMUNICATION APPARATUS, CONTROL METHOD, AND STORAGE MEDIUM

(71) Applicant: CANON KABUSHIKI KAISHA, Tokyo (JP)

(72) Inventor: Mitsuyoshi Yukawa, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/845,698

(22) Filed: Apr. 10, 2020

(65) Prior Publication Data
US 2020/0344763 A1 Oct. 29, 2020

(30) Foreign Application Priority Data
Apr. 26, 2019 (JP) .............................. JP2019-085410

(51) Int. Cl.
*H04W 72/08* (2009.01)
*H04B 7/0413* (2017.01)
*H04W 84/12* (2009.01)

(52) U.S. Cl.
CPC .......... *H04W 72/08* (2013.01); *H04B 7/0413* (2013.01); *H04W 84/12* (2013.01)

(58) Field of Classification Search
CPC ............... H04W 52/367; H04W 76/15; H04W 72/0473; H04W 84/20; H04W 8/245; H04W 72/121; H04W 72/048; H04W 52/243; G01S 7/415; H04L 1/0025; H04L 1/1845; H04L 5/0051; H04B 7/066
See application file for complete search history.

(56) References Cited

U.S. PATENT DOCUMENTS

| | | | | |
|---|---|---|---|---|
| 2010/0284484 A1* | 11/2010 | Jongren | ................... | H04B 7/10 375/267 |
| 2011/0206158 A1* | 8/2011 | Kim | ....................... | H04L 1/005 375/295 |
| 2014/0177461 A1* | 6/2014 | Seyedmehdi | ....... | H04W 72/085 370/336 |
| 2015/0092685 A1* | 4/2015 | Lee | ....................... | H04L 5/0051 370/329 |
| 2018/0084584 A1* | 3/2018 | Umehara | ............ | H04W 72/121 |

(Continued)

*Primary Examiner* — Ayaz R Sheikh
*Assistant Examiner* — Louis Samara
(74) *Attorney, Agent, or Firm* — Canon U.S.A., Inc. IP Division (57) ABSTRACT

When a plurality of apparatuses each having a role of establishing a wireless network performs, in parallel, communication with a first apparatus having a role of joining a wireless network via a plurality of transmission channels, a communication apparatus controls, based on information about a communication quality in communication between a second apparatus included in the plurality of apparatuses and the first apparatus, a transmission output of at least the second apparatus such that a difference decreases between (i) communication quality in communication between an apparatus included in the plurality of apparatuses and different from the second apparatus and the first apparatus and (ii) a communication quality in communication between the second apparatus and the first apparatus. Alternatively, the communication apparatus determines at least one of a coding rate and a modulation scheme for use in communication between the second apparatus and the first apparatus based on the information.

14 Claims, 4 Drawing Sheets

(56) References Cited

U.S. PATENT DOCUMENTS

| | | | |
|---|---|---|---|
| 2019/0245606 A1* | 8/2019 | Ha | H04B 7/066 |
| 2020/0015219 A1* | 1/2020 | Asterjadhi | H04W 72/048 |
| 2020/0052832 A1* | 2/2020 | Tian | H04L 1/1614 |
| 2020/0064444 A1* | 2/2020 | Regani | G01S 7/006 |
| 2020/0213933 A1* | 7/2020 | Patil | H04W 28/0263 |
| 2020/0396695 A1* | 12/2020 | Bhushan | H04W 52/34 |

* cited by examiner

COMMUNICATION APPARATUS, CONTROL METHOD, AND STORAGE MEDIUM

BACKGROUND

Field of the Disclosure

Aspects of the present disclosure generally relate to control of a communication which a plurality of apparatuses performs with another apparatus in parallel.

Description of the Related Art

As the WLAN standards formulated by the Institute of Electrical and Electronics Engineers (IEEE), there are known IEEE 802.11 series standards. Furthermore, WLAN is an abbreviation for wireless local area network.

US Patent Publication No. 2018/0084584 discusses that the IEEE 802.11ax standard is used to perform wireless communication using orthogonal frequency-division multiple access (OFDMA). The IEEE 802.11ax standard attains a high peak throughput by performing wireless communication using OFDMA. Moreover, the IEEE 802.11ax standard improves throughput by employing a technique called multi-user multi-input and multi-output (MU-MIMO), which uses a plurality of transmission antennas and a plurality of receiving antennas simultaneously over the same radio channel.

In the IEEE, the IEEE 802.11be standard, which is a next-generation WLAN standard, is in the process of being formulated by Extremely High Throughput (EHT) Study Group. In the IEEE 802.11be standard, to improve the throughput of the entire system, employing a technique called distributed MIMO is being studied. Distributed MIMO communication enables a plurality of access points (APs) to cooperate to perform communication with one or more stations (STAs) in parallel.

In distributed MIMO communication, a plurality of APs performs communication with one STA in parallel. However, differences may occur in the communication quality in communication performed between one STA and each AP. For example, when the distances between the respective APs and the STA are different from each other, the received signal strength indications (RSSIs) of signals which the STA receives from the respective APs may differ. If, in distributed MIMO communication, the communication qualities in communication between one STA and a plurality of APs differ from each other to a large extent, an issue may occur in which throughput decreases as compared with a case where such differences are small.

SUMMARY

Aspects of some embodiments are generally directed to preventing or reducing a decrease in throughput which may occur when a plurality of apparatuses each having a role of establishing a network performs, in parallel, communication with an apparatus having a role of joining a network.

According to an aspect of some embodiments, a communication apparatus includes an acquisition unit configured to, in a case where a plurality of apparatuses each having a first role of establishing a wireless network performs, in parallel, communication with a first apparatus having a second role of joining a wireless network via a plurality of transmission channels, acquire first information about a communication quality in communication between a second apparatus included in the plurality of apparatuses and the first apparatus, a first control unit configured to, based on the first information acquired by the acquisition unit, control a transmission output of at least the second apparatus in such a manner that a difference between a communication quality in communication between an apparatus included in the plurality of apparatuses and different from the second apparatus and the first apparatus and a communication quality in communication between the second apparatus and the first apparatus becomes smaller, and a second control unit configured to perform control in such a manner that the plurality of apparatuses including the second apparatus performing communication using the transmission output controlled by the first control unit performs, in parallel, communication with the first apparatus via the plurality of transmission channels using distributed multi-input and multi-output (MIMO) conforming to IEEE 802.11be standard.

According to another aspect of some embodiments, a communication apparatus includes an acquisition unit configured to, in a case where a plurality of apparatuses each having a first role of establishing a wireless network performs, in parallel, communication with a first apparatus having a second role of joining a wireless network via a plurality of transmission channels, acquire first information about a communication quality in communication between a second apparatus included in the plurality of apparatuses and the first apparatus, a determination unit configured to determine at least one of a coding rate and a modulation scheme for use in communication between the first apparatus and the second apparatus based on the first information acquired by the acquisition unit, and a control unit configured to perform control in such a manner that the plurality of apparatuses including the second apparatus performing communication using at least one of the modulation scheme and the coding rate determined by the determination unit performs, in parallel, communication with the first apparatus via the plurality of transmission channels.

Further features of various embodiments will become apparent from the following description of exemplary embodiments with reference to the attached drawings.

DESCRIPTION OF THE EMBODIMENTS

Various exemplary embodiments, features, and aspects will be described in detail below with reference to the drawings. Furthermore, the configurations described in the following exemplary embodiments are examples, and some embodiments should not be construed to be limited to the illustrated configurations.

Figure 1:
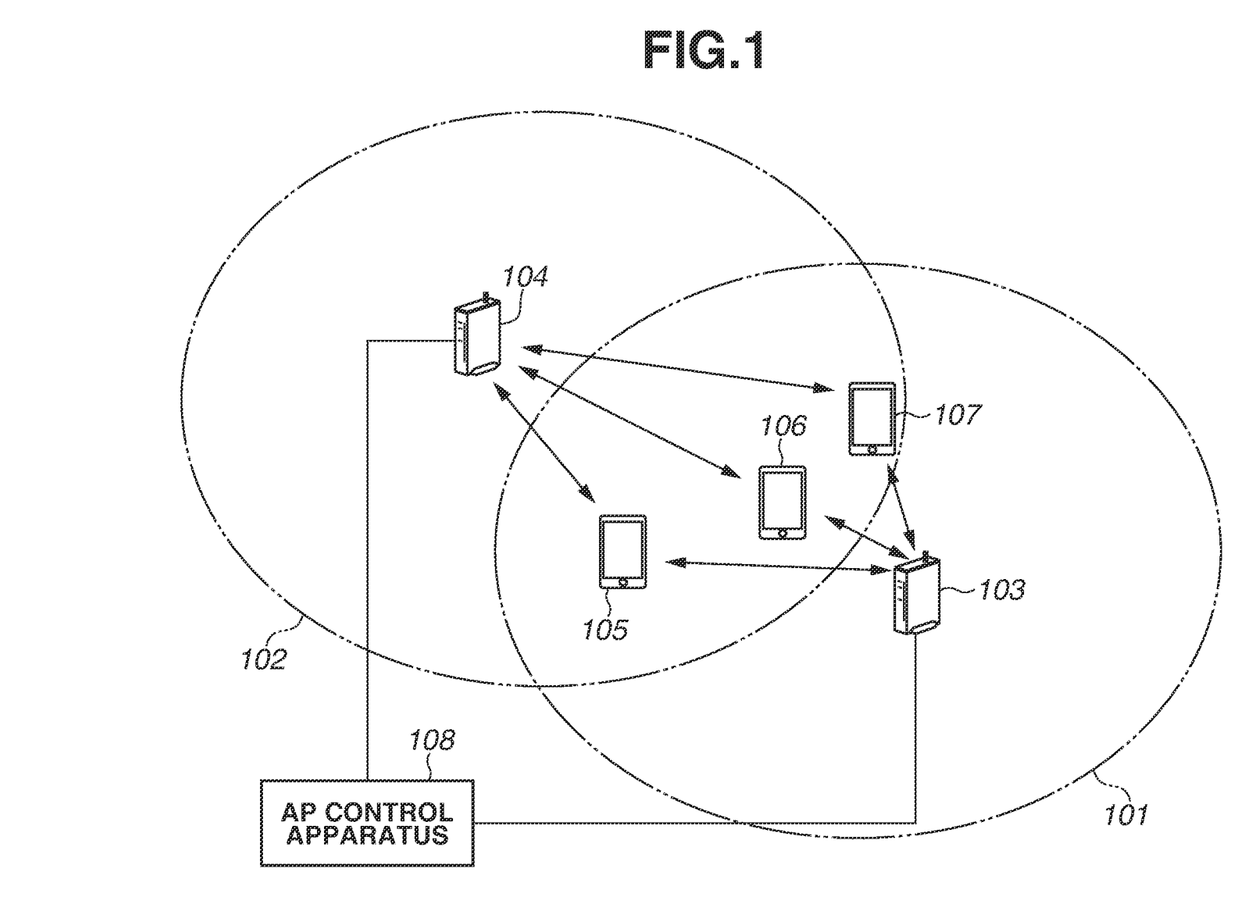
FIG. 1 is a diagram illustrating a configuration of a network which an access point (AP) control apparatus according to an exemplary embodiment joins.

FIG. 1 illustrates a configuration of a network which an access point (AP) control apparatus 108 according to an exemplary embodiment joins. Each of a communication apparatus 103 and a communication apparatus 104 is an access point (AP) having a role of establishing a wireless network. The communication apparatus 103 establishes a wireless network 101, and the communication apparatus 104 establishes a wireless network 102. Each of communication apparatuses 105 to 107 is a station (STA) having a role of joining a wireless network. All of the communication apparatuses 105 to 107 join the wireless network 101 and the wireless network 102. Each communication apparatus is compliant with the IEEE 802.11be standard and is able to perform wireless communication conforming to the IEEE 802.11be standard via the wireless network 101 or the wireless network 102. Furthermore, IEEE is an abbreviation for Institute of Electrical and Electronics Engineers. Each communication apparatus is able to perform communication in a frequency band which is at least one of the 2.4 gigahertz (GHz) band, the 5 GHz band, and the 6 GHz band. Moreover, each communication apparatus is able to perform communication using a frequency bandwidth which is at least one of 20 megahertz (MHz), 40 MHz, 80 MHz, 160 MHz, and 320 MHZ.

The communication apparatuses 103 to 107 are able to achieve multi-user (MU) communication, which multiplexes signals output from a plurality of users, by performing OFDMA communication conforming to the IEEE 802.11be standard. OFDMA is an abbreviation for orthogonal frequency-division multiple access. In OFDMA communication, parts (resource units (RUs)) of partitioned frequency bands are assigned to the respective STAs in such a way as not to overlap each other, and carriers of the respective STAs are orthogonal. Therefore, an AP is able to perform communication with a plurality of STAs in parallel.

Moreover, the communication apparatuses 103 to 107 are able to achieve MU communication using multi-user multi-input and multi-output (MU-MIMO) communication. In this case, the communication apparatus 103 or the communication apparatus 104 includes a plurality of antennas, so that assigning one or more antennas to each of the communication apparatuses 105 to 107 enables achieving simultaneous communication with a plurality of STAs. Each of the communication apparatuses 103 and 104 is able to simultaneously transmit radio waves to a plurality of STAs while performing adjustment in such a manner that radio waves which are transmitted to the respective communication apparatuses 105 to 107 do not interfere with each other.

Moreover, the communication apparatuses 103 to 107 are able to perform distributed MIMO communication. In distributed MIMO communication, a plurality of APs is able to simultaneously perform communication with at least one STA in parallel. In distributed MIMO communication, each STA includes a plurality of antennas, so that assigning one or more antennas to each of a plurality of APs enables achieving simultaneous communication with a plurality of APs. In this case, each AP can also include a plurality of antennas. In a case where an AP includes a plurality of antennas, all of the antennas can be assigned to the same STA, or one or more antennas can be assigned to each of a plurality of STAs. One or more antennas of each of an AP and an STA can be assigned to each of a plurality of STAs or a plurality of APs to enable a plurality of APs and a plurality of STAs to perform simultaneous communication. In distributed MIMO communication, since each STA includes a plurality of antennas and one or more antennas are assigned to each of a plurality of APs, a plurality of radio wave transmission channels is present between each STA and a plurality of APs. In distributed MIMO communication, such a plurality of transmission channels is spatially multiplexed, and a signal is transferred between a plurality of APs and each STA. Performing distributed MIMO communication enables improving a space usage efficiency and thus achieving high-speed communication.

In the case of an example illustrated in FIG. 1, the communication apparatus 103 and the communication apparatus 104, each of which is an AP, cooperate to perform communication with the communication apparatuses 105 to 107, each of which is an STA. Specifically, the communication apparatus 103 and the communication apparatus 104 are able to perform, in parallel, transmission and reception of data with respect to, for example, the communication apparatus 105 at the same time and with use of the same frequency channel. In this case, the communication apparatus 103 and the communication apparatus 104 can transmit data of the same content to the communication apparatus 105 or can transmit respective pieces of data obtained by dividing one piece of data to the communication apparatus 105. Moreover, in the case of transmission of data from the communication apparatus 105, the communication apparatus 105 can transmit data of the same content to the communication apparatus 103 and the communication apparatus 104 or can transmit respective pieces of data obtained by dividing one piece of data to the communication apparatus 103 and the communication apparatus 104.

In the case of performing distributed MIMO communication, there is an issue in which, if received signal strength indications (RSSIs) of signals from a plurality of APs performing communication with one STA differ from each other to a great extent, throughput may decrease. The present exemplary embodiment is configured to control transmission outputs of the respective APs based on the RSSIs, thus making a difference between RSSIs of signals from the respective APs smaller and preventing or reducing a decrease in throughput. Moreover, the present exemplary embodiment excludes an AP which is smaller in RSSI in communication with a given STA than a predetermined threshold value from distributed MIMO communication with the given STA, thus enabling excluding an AP which may significantly differ in RSSI from the other APs and then enabling preventing or reducing a decrease in throughput.

Furthermore, each of the communication apparatus 103 and the communication apparatus 104 each serving as an AP has, in addition to a front haul line used to perform communication with the communication apparatuses 105 to 107 each serving as an STA, a backhaul line in such a way as to enable communication between APs for cooperation. The communication apparatus 103 and the communication apparatus 104 are interconnected via the backhaul line in such a way as to be able to communicate with each other for cooperation. Moreover, the communication apparatus 103 and the communication apparatus 104 are controlled by the AP control apparatus 108, which is connected thereto via the backhaul line, thus achieving distributed MIMO communication.

Furthermore, any one of the communication apparatus 103 and the communication apparatus 104 can be configured to be able to operate as an AP control apparatus 108 in addition to operating as an AP. In this case, the AP control apparatus 108 can be omitted. Alternatively, the AP control apparatus 108 can be an adapter having the function of being able to control each AP in distributed MIMO communication. In this case, the user is enabled to use the AP control apparatus 108 as an adapter with the AP control apparatus 108 connected to the communication apparatus 103 or the communication apparatus 104.

Furthermore, the backhaul line can be used for wired communication or can be used for wireless communication. Moreover, in a case where wireless communication is used in the backhaul line, wireless communication conforming to the same communication standard as that of the fronthaul line can be performed. Alternatively, wireless communications conforming to respective different communication standards can be respectively performed in the fronthaul line and the backhaul Furthermore, the communication apparatuses 103 to 107 are configured to be compliant with the IEEE 802.11be standard, but can be configured to be compliant with, in addition to that, a legacy standard which is a standard previous to the IEEE 802.11be standard. Specifically, the communication apparatuses 103 to 107 can be compliant with at least one of IEEE 802.11a, 802.11b, 802.11g, 802.11n, 802.11ac, and 802.11ax standards. Moreover, the communication apparatuses 103 to 107 can be compliant with, in addition to the IEEE 802.11 series standards, other communication standards, such as Bluetooth®, NFC, UWB, ZigBee, and MBOA. Furthermore, UWB is an abbreviation for ultra-wide band, and MBOA is an abbreviation for MultiBand OFDM Alliance. Moreover, NFC is an abbreviation for near-field communication. UWB includes, for example, Wireless Universal Serial Bus (USB), Wireless 1394, and WiNET. Moreover, the communication apparatuses 103 to 107 can be compliant with communication standards for wired communication, such as wired local area network (LAN).

While specific examples of each of the communication apparatuses 103 and 104 include a wireless LAN router and a personal computer (PC), each of the communication apparatuses 103 and 104 is not limited to these. Moreover, each of the communication apparatuses 103 and 104 can be an information processing apparatus, such as a wireless chip capable of performing wireless communication conforming to the IEEE 802.11be standard. Moreover, while specific examples of each of the communication apparatuses 105 to 107 include a camera, a tablet, a smartphone, a PC, a mobile phone, and a video camera, each of the communication apparatuses 105 to 107 is not limited to these. Moreover, each of the communication apparatuses 105 to 107 can be an information processing apparatus, such as a wireless chip capable of performing wireless communication conforming to the IEEE 802.11be standard. Moreover, while the network illustrated in FIG. 1 is a network composed of two APs and three STAs, the numbers of APs and STAs are not limited to these.

Figure 2:
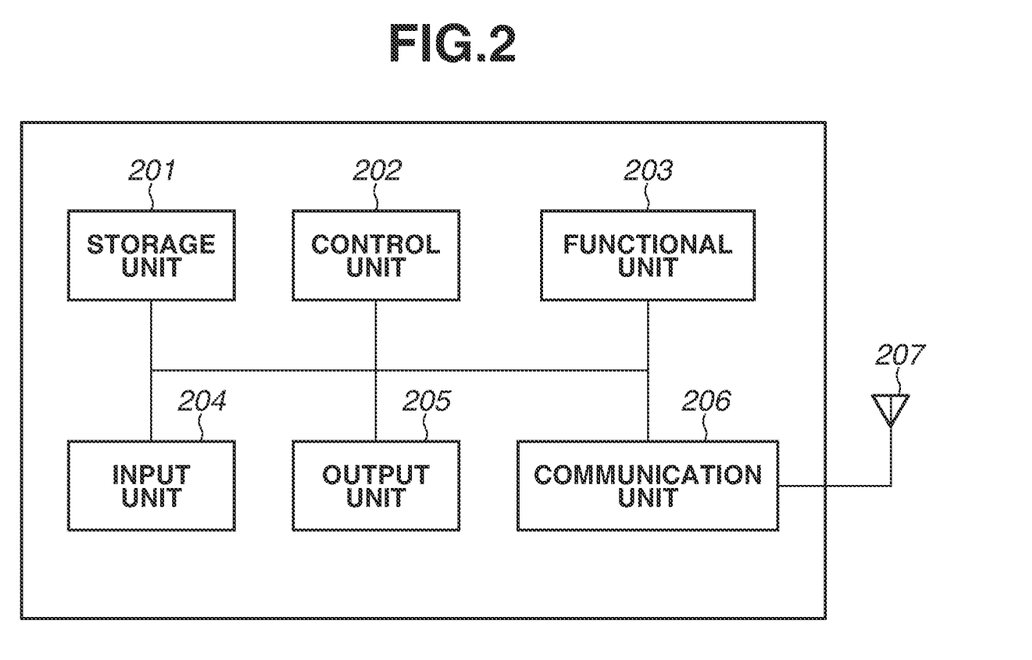
FIG. 2 is a diagram illustrating a hardware configuration of the AP control apparatus.

FIG. 2 illustrates a hardware configuration of the AP control apparatus 108 in the present exemplary embodiment. The AP control apparatus 108 includes a storage unit 201, a control unit 202, a functional unit 203, an input unit 204, an output unit 205, a communication unit 206, and an antenna 207.

The storage unit 201 is configured with one or more memories, such as a ROM and a RAM, and stores a computer program for performing various operations described below and various pieces of information such, as communication parameters used for wireless communication. ROM is an abbreviation for read-only memory, and RAM is an abbreviation for random access memory. Furthermore, the storage unit 201 can be configured with, in addition to memories, such as a ROM and a RAM, a storage medium such as a flexible disc, a hard disk, an optical disc, a magneto-optical disc, a compact disc (CD)-ROM, a CD-R, a magnetic tape, a non-volatile memory, or a digital versatile disc (DVD). Moreover, the storage unit 201 can include, for example, a plurality of memories.

The control unit 202 is configured with one or more processors, such as a CPU or an MPU, and controls the entire AP control apparatus 108 by executing the computer program stored in the storage unit 201. Furthermore, the control unit 202 can be configured to control the entire AP control apparatus 108 by causing the computer program stored in the storage unit 201 and an operating system (OS) to cooperate with each other. Moreover, the control unit 202 generates data or signals which are to be transmitted in communication with another communication apparatus. Furthermore, CPU is an abbreviation for central processing unit, and MPU is an abbreviation for micro processing unit. Moreover, the control unit 202 can include a plurality of processors, such as multicores, and can cause the plurality of processors to control the entire AP control apparatus 108.

Moreover, the control unit 202 controls the functional unit 203 to perform predetermined processing, such as wireless communication, image capturing, printing, or projection. The functional unit 203 is hardware used for the AP control apparatus 108 to perform predetermined processing.

The input unit 204 performs reception of various operations performed by the user. The output unit 205 provides various outputs to the user via a monitor screen or a loudspeaker. Here, the outputs provided by the output unit 205 can be, for example, displaying on the monitor screen, sound output from the loudspeaker, or vibration output. Furthermore, both the input unit 204 and the output unit 205 can be implemented as a single module, such as a touch panel. Moreover, each of the input unit 204 and the output unit 205 can be integral with the AP control apparatus 108 or can be separate from the AP control apparatus 108. Moreover, the AP control apparatus 108 can be an apparatus which does not include at least one of the input unit 204 and the output unit 205.

The communication unit 206 performs control over wireless communication conforming to the IEEE 802.11be standard. Moreover, the communication unit 206 can perform control over wireless communication conforming to another IEEE 802.11 series standard in addition to the IEEE 802.11be standard or control over wired communication, such as wired LAN. The communication unit 206 controls the antenna 207 to perform transmission and reception regarding a wireless signal for wireless communication generated by the control unit 202. Furthermore, the antenna 207 can be configured as a member separate from the communication unit 206, or can be configured as a single module integral with the communication unit 206.

Furthermore, the AP control apparatus 108 can be an apparatus capable of performing only wired communication, and can be an apparatus which does not include the antenna 207. Furthermore, in a case where the AP control apparatus 108 is compliant with, in addition to the IEEE 802.11be standard, for example, the NFC standard or the Bluetooth® standard, the AP control apparatus 108 can be configured to control wireless communication conforming to these communication standards. Moreover, in a case where the AP control apparatus 108 is able to perform wireless communication conforming to a plurality of communication standards, the AP control apparatus 108 can be configured to individually include communication units 206 and antennas 207 compliant with the respective communication standards. The AP control apparatus 108 performs communication of various pieces of data, such as image data, document data, video data, and control data, with the communication apparatus 103 and the communication apparatus 104 via the communication unit 206.

Each of the communication apparatuses 103 to 107 can be configured to include a hardware configuration similar to that of the AP control apparatus 108. Furthermore, each of the communication apparatus 103 and the communication apparatus 104 can include, as the communication unit 206, in addition to a communication unit for a fronthaul line used for communicating with an STA, a communication unit for a backhaul line used for communicating with another AP. Alternatively, each of the communication apparatus 103 and the communication apparatus 104 can include a shared communication unit for both a fronthaul line and a backhaul line.

Figure 3:
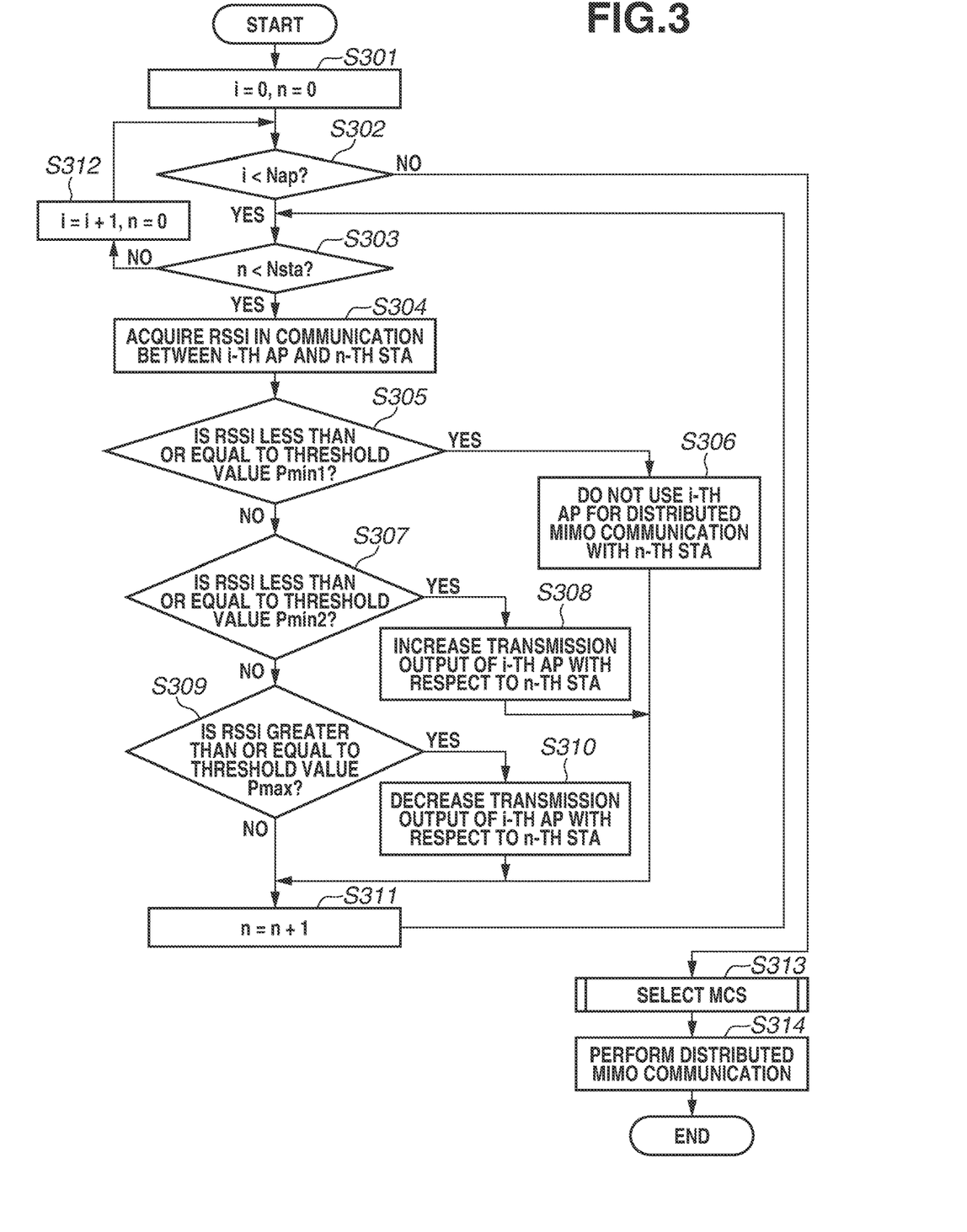
FIG. 3 is a flowchart illustrating processing which the AP control apparatus performs to control a transmission output of each AP in distributed multi-input and multi-output (MIMO) communication.

FIG. 3 is a flowchart illustrating processing which is performed by the control unit 202 reading out a computer program stored in the storage unit 201 and executing the program when the AP control apparatus 108 controls a transmission output of each AP in distributed MIMO communication.

The AP control apparatus 108 starts processing in the present flow when being instructed by the user to start distributed MIMO communication. Alternatively, the AP control apparatus 108 can start processing in the present flow based on receiving, from the communication apparatus 103 or the communication apparatus 104 serving as an AP, a request signal for requesting starting of distributed MIMO communication. Furthermore, the communication apparatus 103 or the communication apparatus 104 can transmit the above-mentioned request signal to the AP control apparatus 108 based on being requested by any one of the communication apparatuses 105 to 107 serving as an STA to start distributed MIMO communication. Alternatively, the AP control apparatus 108 can be requested by any one of the communication apparatuses 105 to 107 serving as an STA to start distributed MIMO communication.

Alternatively, the communication apparatus 103 or the communication apparatus 104 can request the AP control apparatus 108 to perform distributed MIMO communication, based on the size of data which the communication apparatus 103 or the communication apparatus 104 transmits to any one of the communication apparatuses 105 to 107 being greater than or equal to a predetermined size. Alternatively, any one of the communication apparatuses 105 to 107 can request the AP control apparatus 108 to perform distributed MIMO communication via the communication apparatus 103 or the communication apparatus 104, based on the size of data which such any one of the communication apparatuses 105 to 107 transmits being greater than or equal to a predetermined size. Alternatively, the AP control apparatus 108 can start processing in the present flow based on the size of data which is transmitted between the communication apparatus 103 or the communication apparatus 104 and at least one of the communication apparatuses 105 to 107 being greater than or equal to a predetermined size.

Furthermore, at least one of the communication apparatuses 103 to 107 can request execution of distributed MIMO communication based on the data amount of data accumulated in a transmission buffer included therein being greater than or equal to a predetermined amount in addition to or in place of the size of data which is communicated. Alternatively, the AP control apparatus 108 can start processing in the present flow to perform distributed MIMO communication based on an error rate in wireless communication between each communication apparatus being greater than or equal to a predetermined threshold value in addition to or in place of the size of data which is communicated. Alternatively, the AP control apparatus 108 can start processing in the present flow to perform distributed MIMO communication based on a delay time in wireless communication between each communication apparatus being greater than or equal to a predetermined threshold value.

In S301, first, the AP control apparatus 108 initializes a variable i, which is used to specify an AP the transmission output of which is to be determined, and a variable n, which is used to specify an STA which serves as a communication partner.

Next, in S302, the AP control apparatus 108 determines whether the variable i is smaller than the total number of Aps $N_{ap}$ (which may also be referred to herein as the "total number $N_{ap}$"), the transmission output of each of which is to be determined. Furthermore, it is assumed that the AP control apparatus 108 has previously acquired the total number of Aps ($N_{ap}$), the transmission output of each of which is to be set, i.e., APs which join distributed MIMO communication, before processing in the present flow is started or processing in S302 is started. The APs which join distributed MIMO communication are all of or part of the APs to which the AP control apparatus 108 currently connects via the backhaul line. Which APs join distributed MIMO communication can be determined by the user or can be determined by the AP control apparatus 108. If it is determined that the variable i is not smaller than the total number $N_{ap}$ (NO in S302), the AP control apparatus 108 performs processing in S313. The case where the variable i is not smaller than the total number $N_{ap}$ is a case where the AP control apparatus 108 has completed setting the transmission outputs of all of the APs which join distributed MIMO communication. On the other hand, if it is determined that the variable i is smaller than the total number $N_{ap}$ (YES in S302), i.e., in a case where the AP control apparatus 108 has not yet completed setting the transmission outputs of all of the APs which join distributed MIMO communication, the AP control apparatus 108 performs processing in S303.

In S303, the AP control apparatus 108 determines whether the variable n is smaller than the total number Nsta of STAs each of which serves as a communication partner. Furthermore, it is assumed that the AP control apparatus 108 has previously acquired the total number of Nsta of STAs each of which serves as a communication partner, i.e., STAs which join distributed MIMO communication, before processing in the present flow is started or processing in S303 is started. The STAs which join distributed MIMO communication are determined by a selection made by the user. Alternatively, the STAs which join distributed MIMO communication are STAs which have requested the AP control apparatus 108 to perform distributed MIMO communication. Alternatively, the STAs which join distributed MIMO communication are STAs which have joined a wireless network which is currently established by the i-th AP before the present operation is started. Alternatively, the AP control apparatus 108 can specify STAs with respect to which to perform distributed MIMO communication. If it is determined that the variable n is not smaller than the total number Nsta (NO in S303), the AP control apparatus 108 performs processing in S312. The case where the variable n is not smaller than the total number Nsta is a case where the AP control apparatus 108 has completed setting the transmission output which the i-th AP uses to perform communication with each STA with respect to all of the STAs which join distributed MIMO communication. On the other hand, if it is determined that the variable n is smaller than the total number Nsta (YES in S303), i.e., in a case where the AP control apparatus 108 has not yet completed setting the transmission output of the i-th AP with respect to all of the STAs which join distributed MIMO communication, the AP control apparatus 108 performs processing in S304.

In S304, the AP control apparatus 108 acquires received signal strength indication (RSSI) in a communication between the i-th AP and the n-th STA. The i-th AP keeps RSSI of a signal received from the n-th STA stored therein. The AP control apparatus 108 acquires, from the i-th AP, RSSI of the signal received from the n-th STA. Alternatively, the AP control apparatus 108 can acquire, from the n-th STA, RSSI that is based on a signal, such as a beacon, which the i-th AP has transmitted. In this case, the i-th AP can acquire RSSI from the n-th STA and then communicate the acquired RSSI to the AP control apparatus 108. Alternatively, the AP control apparatus 108 can issue an instruction to the i-th AP to transmit an acquisition request for RSSI to the n-th STA. Upon receiving the acquisition request for RSSI from the i-th AP, the n-th STA communicates RSSI obtained at the time of reception of the acquisition request to the i-th AP or the AP control apparatus 108. The AP control apparatus 108 acquires information about RSSI from the n-th STA directly or via the i-th AP.

In S305, the AP control apparatus 108 determines whether the acquired RSSI is less than or equal to a predetermined threshold value Pmin1. The predetermined threshold value Pmin1 can be previously preset in the AP control apparatus 108, or can be set by the user. If it is determined that the acquired RSSI is less than or equal to the predetermined threshold value Pmin1 (YES in S305), the AP control apparatus 108 performs processing in S306. On the other hand, if it is determined that the acquired RSSI is greater than the predetermined threshold value Pmin1 (NO in S305), the AP control apparatus 108 performs processing in S307.

In S306, the AP control apparatus 108 performs control in such a way as not to use the i-th AP for distributed MIMO communication with the n-th STA. Specifically, in distributed MIMO communication which the AP control apparatus 108 performs in S314 described, the AP control apparatus 108 performs distributed MIMO communication with the n-th STA without using the i-th AP. In the case of increasing the transmission output of an AP which is low in RSSI, since, in each country, there are regulatory restrains on the upper limit of transmission outputs of APs, there is a limit on an increase in transmission output. Therefore, even if the transmission output is increased with respect to an AP the RSSI of which is smaller than a predetermined threshold value, the AP may differ greatly in RSSI from other APs. Eliminating an AP the RSSI of which is smaller than the predetermined threshold value from distributed MIMO communication with STAs enables excluding an AP which may differ greatly in RSSI from the other APs, thus preventing or reducing a decrease in throughput. Upon completing processing in S306, the AP control apparatus 108 performs processing in S311.

On the other hand, if the determination made in S305 is NO, then in S307, the AP control apparatus 108 determines whether the acquired RSSI is less than or equal to a predetermined threshold value Pmin2. Furthermore, the threshold value Pmin2 is a value greater than the threshold value Pmin1. The predetermined threshold value Pmin2 can be previously preset in the AP control apparatus 108, or can be set by the user. If it is determined that the acquired RSSI is neither less than nor equal to the predetermined threshold value Pmin2 (NO in S307), the AP control apparatus 108 performs processing in S309. On the other hand, if it is determined that the acquired RSSI is less than or equal to the predetermined threshold value Pmin2 (YES in S307), the AP control apparatus 108 performs processing in S308.

In S308, the AP control apparatus 108 increases the transmission output of the i-th AP which is set when the i-th AP performs communication with the n-th STA. Specifically, the AP control apparatus 108 transmits an instruction signal for instructing the i-th AP to increase the transmission output thereof when performing communication with the n-th STA. Alternatively, the AP control apparatus 108 can transmit, to the i-th AP, an instruction for a transmission output which is to be set when the i-th AP performs communication with the n-th STA. In this case, the AP control apparatus 108 can determine an increase rate of the transmission output based on the value of the acquired RSSI. For example, the AP control apparatus 108 can determine an increase rate of the transmission output based on the ratio of the acquired RSSI to the threshold value Pmin2. For example, in a case where the acquired RSSI is ½ of the threshold value Pmin2, the AP control apparatus 108 can determine an increase rate of the transmission output to be $10^2$ times. RSSI is a value expressed by unit "decibel-milliwatts (dBm)", and is calculated by "RSSI [dBm]=10 log A" with respect to power A milliwatt (mW). Therefore, the increase rate of the transmission output becomes $10^{\{(\text{threshold value Pmin2}-\text{RSSI})/10\}}$ Alternatively, the AP control apparatus 108 can previously retain a table which indicates an increase rate of the transmission output with respect to each value of the acquired RSSI and determine the increase rate based on the table. In the case of increasing the transmission output of an AP, the AP control apparatus 108 performs control in such a manner that the acquired RSSI does not exceed a threshold value Pmax described below. Moreover, in the case of increasing the transmission output of an AP, the AP control apparatus 108 performs control in such a manner that the increased transmission output does not exceed the maximum value of transmission outputs prescribed by regulatory restraints in each country. Upon increasing the transmission output of the i-th AP with respect to the n-th STA, the AP control apparatus 108 performs processing in S311.

Furthermore, the AP control apparatus 108 can perform control to cause the i-th AP to perform communication at the transmission output determined in S308 only in a case where the i-th AP performs communication with the n-th STA using distributed MIMO communication. In this case, when the i-th AP performs communication with the n-th STA without using distributed MIMO communication, the i-th AP can perform communication at a transmission output set before being controlled in S308 or at a transmission output different from the transmission output determined in S308.

On the other hand, if the determination in S307 is NO, then in S309, the AP control apparatus 108 determines whether the acquired RSSI is greater than or equal to a predetermined threshold value Pmax. Furthermore, the predetermined threshold value Pmax is set to a value greater than each of the threshold value Pmin1 and the threshold value Pmin2. The predetermined threshold value Pmax can be previously preset in the AP control apparatus 108, or can be set by the user. If it is determined that the acquired RSSI is neither greater than nor equal to the predetermined threshold value Pmax (NO in S309), the AP control apparatus 108 performs processing in S311. On the other hand, if it is determined that the acquired RSSI is greater than or equal to the predetermined threshold value Pmax (YES in S309), the AP control apparatus 108 performs processing in S310.

In S310, the AP control apparatus 108 decreases the transmission output of the i-th AP which is set when the i-th AP performs communication with the n-th STA. Specifically, the AP control apparatus 108 transmits an instruction signal for instructing the i-th AP to decrease the transmission output thereof when performing communication with the n-th STA. Alternatively, the AP control apparatus 108 can transmit, to the i-th AP, an instruction for a transmission output which is to be set when the i-th AP performs communication with the n-th STA. In this case, the AP control apparatus 108 can determine a decrease rate of the transmission output based on the value of the acquired RSSI. For example, the AP control apparatus 108 can determine a decrease rate of the transmission output based on the ratio of the acquired RSSI to the threshold value Pmax. In this case, the decrease rate of the transmission output becomes $10^{\wedge}-\{(RSSI-\text{threshold value Pmax})/10\}$. Alternatively, the AP control apparatus 108 can previously retain a table which indicates a decrease rate of the transmission output with respect to each value of the acquired RSSI and determine the decrease rate based on the table. In the case of decreasing the transmission output of an AP, the AP control apparatus 108 performs control in such a manner that the acquired RSSI does not fall below the threshold value Pmin2. Upon decreasing the transmission output of the i-th AP with respect to the n-th STA, the AP control apparatus 108 performs processing in S311.

Furthermore, the AP control apparatus 108 can perform control to cause the i-th AP to perform communication at the transmission output determined in S310 only in a case where the i-th AP performs communication with the n-th STA using distributed MIMO communication. In this case, when the i-th AP performs communication with the n-th STA without using distributed MIMO communication, the i-th AP can perform communication at a transmission output set before being controlled in S310 or at a transmission output different from the transmission output determined in S310.

In this way, the AP control apparatus 108 controls the transmission output of each AP in such a manner that RSSI in a communication between each AP and the n-th STA falls within the range of the threshold value Pmin2 to the threshold value Pmax, thus enabling reducing a difference between RSSIs of the respective APs in communications with the n-th STA. This enables a decrease in throughput in distributed MIMO communication.

Furthermore, while, in FIG. 3, the threshold value Pmin2 and the threshold value Pmax are set to different values, the present exemplary embodiment is not limited to this, and the threshold value Pmin2 and the threshold value Pmax can be equal to each other. In this case, the AP control apparatus 108 controls the transmission output of the i-th AP in such a mariner that RSSI in a communication with the n-th STA (RSSI acquired in S304) comes close to the threshold value Pmin2 (threshold value Pmax). This decreases a difference in RSSI in communications between the n-th STA and the respective APs, thus enabling preventing or reducing a decrease in throughput.

Moreover, while, in FIG. 3, the threshold value Pmin1, the threshold value Pmin2, and the threshold value Pmax can be previously set in the AP control apparatus 108 or can be set by the user, the present exemplary embodiment is not limited to this. The AP control apparatus 108 can determine these threshold values based on RSSI in a communication between the n-th STA and a predetermined AP. Here, the predetermined AP is one of a plurality of APs which performs distributed MIMO communication with the n-th STA. Based on RSSI in a communication with which AP to determine these threshold values can be selected by the user or can be selected by the AP control apparatus 108 operating according to a predetermined algorithm. For example, the AP control apparatus 108 can determine these threshold values based on RSSI which is first acquired from the n-th STA. When determining the threshold values based on RSSI in a communication between a predetermined AP and the n-th STA, for example, the AP control apparatus 108 determines a value obtained by adding a predetermined value P1 to the RSSI as the threshold value Pmax and determines a value obtained by subtracting the predetermined value P1 from the RSSI as the threshold value Pmin2. Moreover, the AP control apparatus 108 determines a value obtained by subtracting a predetermined value P2 from the RSSI as the threshold value Pmin1. Furthermore, the predetermined values P1 and P2 can be previously preset in the AP control apparatus 108, or can be set by the user. In this way, the AP control apparatus 108 determines the threshold values based on RSSI in a communication between a predetermined AP and the n-th STA, thus being able to relatively determine an increase rate or decrease rate of the transmission output in a communication between another AP and the n-th STA.

Upon determining the transmission output of the i-th AP with respect to the n-th STA, then in S311, the AP control apparatus 108 increments the variable n to determine the transmission output with respect to a next STA. Then, the AP control apparatus 108 performs processing in S303.

When the AP control apparatus 108 has determined the transmission outputs of the i-th AP with respect to all of the STAs, the determination in S303 becomes NO. In this case, in S312, the AP control apparatus 108 increments the variable i and initializes the variable n, and then performs processing in S302.

When the AP control apparatus 108 has determined the transmission outputs of all of the APs, the determination in S302 becomes NO. Next, in S313, the AP control apparatus 108 determines a modulation scheme and a coding scheme in a communication with each STA with respect to the APs the transmission outputs of which have been determined. Details of the present operation are described below with reference to FIG. 4.

Figure 4:
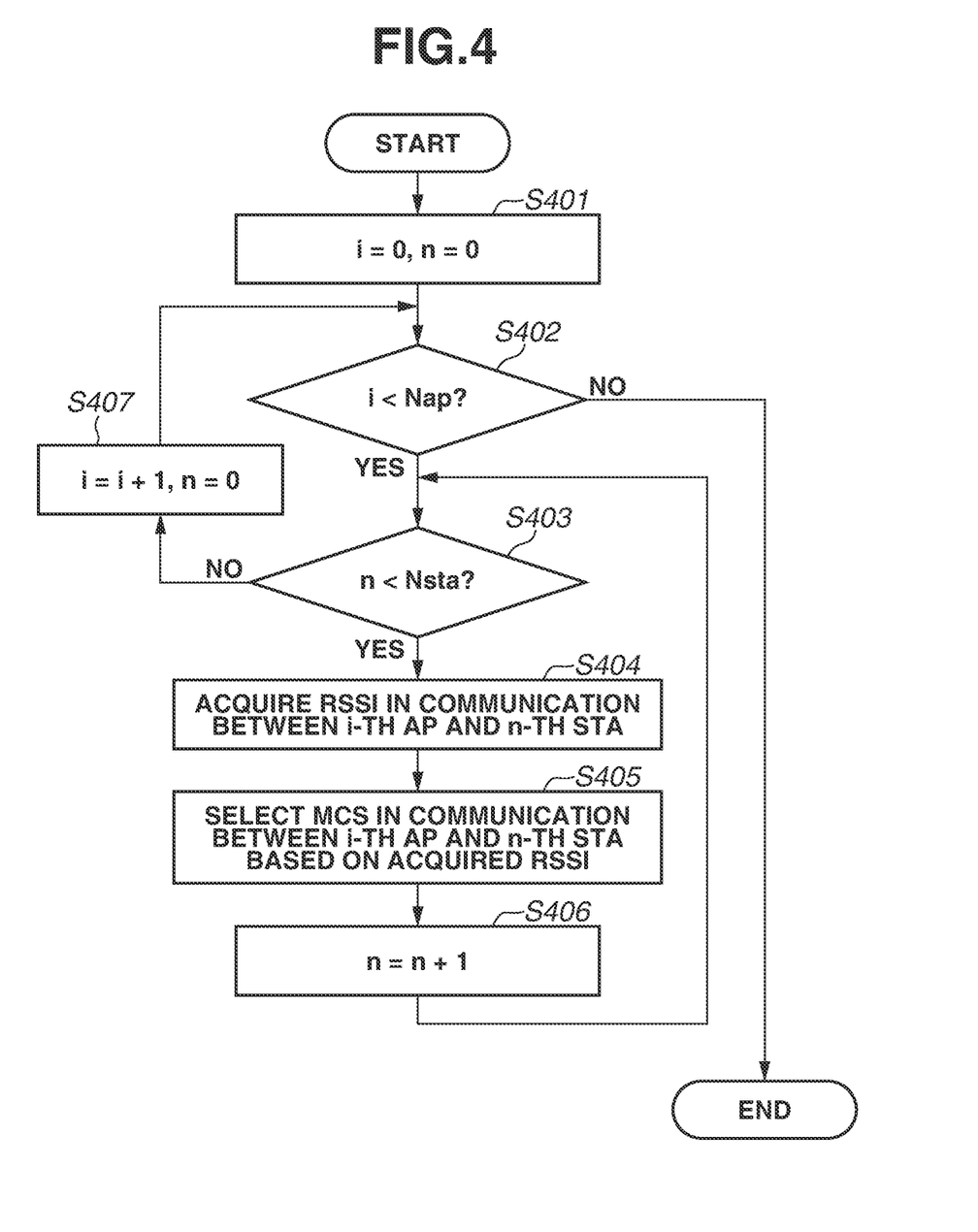
FIG. 4 is a flowchart illustrating processing which the AP control apparatus performs in S313 illustrated in FIG. 3.

FIG. 4 is a flowchart illustrating processing which is performed by the control unit 202 reading out a computer program stored in the storage unit 201 and executing the program when the AP control apparatus 108 performs processing in S313 illustrated in FIG. 3.

In S401 to S403, the AP control apparatus 108 performs processing similar to that in S301 to S303 illustrated in FIG. 3. Furthermore, if the determination in S402 is NO, the AP control apparatus 108 ends the processing in the present flow and then performs processing in S314 illustrated in FIG. 3. Moreover, if the determination in S403 is NO, the AP control apparatus 108 performs processing in S407. The AP control apparatus 108 performs processing in S407 similarly to S312 illustrated in FIG. 3.

In S404, the AP control apparatus 108 acquires RSSI in a communication between the i-th AP and the n-th STA. In the present operation, the AP control apparatus 108 causes the i-th AP to transmit, to the n-th STA, a signal at the transmission output determined in the flow illustrated in FIG. 3, and receives RS SI of the signal from the n-th STA.

In S405, the AP control apparatus 108 determines Modulation and Coding Scheme (MCS) in a communication between the i-th AP and the n-th STA based on the acquired RSSI.

Table 1 shows a list of MCS indexes which are used when the communication apparatuses 103 to 107 perform communications conforming to the IEEE 802.11 series standards. Each MCS index is an index indicating a combination of a modulation scheme and a coding rate in each communication. For example, in the case of MCS=0, each communication apparatus performs communication using binary phase-shift keying (BPSK) as a modulation scheme and setting a coding rate to ½. Furthermore, a correspondence relationship between MCS indexes, modulation schemes, and coding rates is not limited to that shown in Table 1.

TABLE 1

| MCS index | Modulation scheme | Coding rate |
|---|---|---|
| MCS0 | BPSK | 1/2 |
| MCS1 | QPSK | 1/2 |
| MCS2 | QPSK | 3/4 |
| MCS3 | 16QAM | 1/2 |
| MCS4 | 16QAM | 3/4 |
| MCS5 | 16QAM | 2/3 |
| MCS6 | 64QAM | 3/4 |
| MCS7 | 64QAM | 5/6 |
| MCS8 | 256QAM | 3/4 |
| MCS9 | 256QAM | 5/6 |
| MCS10 | 1024QAM | 3/4 |
| MCS11 | 1024QAM | 5/6 |

As a more multi-valued modulation scheme is used, the amount of information which is able to be transmitted with one symbol (signal) become larger, so that the communication rate becomes higher. Moreover, as the coding rate is higher, the communication rate becomes higher. However, as a more multi-valued modulation scheme or a higher coding rate is used, communications become more susceptible to an influence of, for example, noise radio waves, so that a signal-to-noise ratio (SNR) required for communication becomes higher. In other words, as the SNR is higher, communications using a more multi-valued modulation scheme and a higher coding rate (higher MCS index) can be performed, and this enables performing communication at a higher communication rate. Moreover, in a case where the noise intensity is fixed, as the received signal strength indication (RSSI) is higher, the SNR becomes a larger value. Therefore, performing a communication using a more multi-valued modulation scheme and a higher coding rate as the RSSI is higher enables performing communication at a higher communication rate.

On the other hand, in a case where the SNR or RSSI is low, it is appropriate to perform a communication using a modulation scheme in which the amount of information able to be transmitted with one symbol (signal) is small or a low coding rate. Furthermore, conceivable causes for RSSI decreasing include, for example, a physical distance between an AP and an STA being large and an object which blocks radio waves being present between an AP and an STA.

In S405, the AP control apparatus 108 selects MCS which is used in a communication between the i-th AP and the n-th STA from a table indicating a correspondence between RSSI and MCS, which the AP control apparatus 108 previously retains. This table is given as MCSs in which, as RSSI is higher, MCS having a higher communication rate is to be selected. The present table can be previously preset in the AP control apparatus 108, can be set by the user.

Upon completing processing in S405, then, the AP control apparatus 108 performs processing in S406. The AP control apparatus 108 performs processing in S406 similarly to that in S311 illustrated in FIG. 3.

When the AP control apparatus 108 has determined MCS with respect to all of the APs for which distributed MIMO communication is performed, the determination in S402 becomes NO. In this case, the AP control apparatus 108 ends processing in the present flow.

Performing processing in the flow illustrated in FIG. 4 enables setting appropriate MCS with respect to an AP the transmission output of which has been changed. Particularly, since it is conceivable that RSSI decreases with respect to an AP the transmission output of which has been decreased, setting MCS that is based on new RSSI enables reducing possibilities of failure in communication with an STA.

Furthermore, since, in S308 or S310 illustrated in FIG. 3, it is not necessary to change MCS with respect to an AP the transmission output of which is not controlled, S313 can be skipped. In this case, when performing communication with the n-th STA, the i-th AP performs distributed MIMO communication using MCS which has already been used for communication with the n-th STA. Therefore, the i-th AP is able to perform distributed MIMO communication with the n-th STA using the same MCS as that used in ordinary one-to-one communication with the n-th STA.

Upon ending processing in the flow illustrated in FIG. 4, the AP control apparatus 108 performs processing in S314 illustrated in FIG. 3. Specifically, the AP control apparatus 108 performs distributed MIMO communication using the transmission output and MCS determined in the flows illustrated in FIG. 3 and FIG. 4.

More specifically, first, the AP control apparatus 108 notifies each AP of starting of distributed MIMO communication. In response to being notified of starting of distributed MIMO communication from the AP control apparatus 108, each AP transitions from a mode of performing normal wireless communication to a mode of performing distributed MIMO communication. The AP control apparatus 108 transmits data which is to be transmitted to the n-th STA to all of the APs which perform distributed MIMO communication with the n-th STA. At this time, the AP control apparatus 108 can assign pieces of data obtained by dividing the data which is to be transmitted to the n-th STA to the respective APs or can transmit the same data to each AP. Each AP notifies the AP control apparatus 108 of receipt of the data. Upon receiving a notification of receipt of the data from all of the APs to which the AP control apparatus 108 has transmitted the data, the AP control apparatus 108 transmits a trigger frame to all of the APs to which the AP control apparatus 108 has transmitted the data. The trigger frame includes information indicating an STA serving as a destination for data and information indicating transmission timing for data. Furthermore, the AP control apparatus 108 can notify each AP of information indicating an STA serving as a destination for data in conjunction with notifying each AP of starting of distributed MIMO communication, or can notify each AP of such information at any time after that and before transmitting a trigger frame. Each AP which has received the trigger frame transmits data to the STA when transmission timing is reached. Each AP which has transmitted the data notifies the AP control apparatus 108 of completion of transmission of the data. Upon receiving a notification of transmission of the data being completed from all of the APs which have completed transmission of the data, the AP control apparatus 108 notifies each AP of distributed MIMO communication being ended. Each AP which has been notified of ending of distributed MIMO communication transitions from the mode of performing distributed MIMO communication to the mode of performing normal wireless communication. Furthermore, in a case where, when the AP control apparatus 108 has received a notification of transmission of the data being completed from all of the APs which have completed transmission of the data, there yet remains data to be transmitted in distributed MIMO communication, the AP control apparatus 108 performs distributed MIMO communication with respect to such remaining data. Furthermore, the destination for data can be the same STA as an STA to which data has been previously transmitted or can be a different STA. Upon ending of distributed MIMO communication, the AP control apparatus 108 ends processing in the present flow.

Furthermore, while, in the flow illustrated in FIG. 4, the AP control apparatus 108 selects MCS. the present exemplary embodiment is not limited to this, and the AP control apparatus 108 can be configured to select only at least one of a modulation scheme and a coding rate. In this case, in S314 illustrated in FIG. 3, the AP control apparatus 108 performs control to perform distributed MIMO communication using a modulation scheme or a coding rate determined in the flow illustrated in FIG. 4.

When the AP control apparatus 108 performs distributed MIMO communication in S314, each AP which performs distributed MIMO communication performs communication using the transmission output determined in the flow illustrated in FIG. 3 with respect to each STA. In this case, the AP control apparatus 108 can set with which STA to perform distributed MIMO communication at respective separate times. For example, the AP control apparatus 108 can perform control in such a manner that the communication apparatus 103 and the communication apparatus 104 each serving as an AP perform communication with the communication apparatus 105 serving as an STA in a period from time T1 to time T2 and perform communication with the communication apparatus 106 serving as another STA in a period from time T2 to time T3. In this way, if the AP control apparatus 108 sets with which STA to perform distributed MIMO communication at respective separate times, each AP performs communication at the transmission output corresponding to an STA serving as a communication partner at a separate time.

Performing the flow illustrated in FIG. 3 to set a transmission output appropriate for each STA with respect to a plurality of APs which perform distributed MIMO communication enables reducing a difference in RSSI of each AP relative to each STA and preventing or reducing a decrease in throughput in performing distributed MIMO communication.

For example, in a case where the i-th AP and the (i+1)-th AP perform distributed MIMO communication with the n-th STA, if RSSI in each of the i-th AP and the (i+1)-th AP is less than or equal to the threshold value Pmin2, the AP control apparatus 108 increases the transmission outputs of both the i-th AP and the (i+1)-th AP. Alternatively, if RSSI in each of the i-th AP and the (i+1)-th AP is greater than or equal to the threshold value Pmax, the AP control apparatus 108 decreases the transmission outputs of both the i-th AP and the (i+1)-th AP. Alternatively, if RSSI in the i-th AP is less than or equal to the threshold value Pmin2 but RSSI in the (i+1)-th AP is greater than or equal to the threshold value Pmax, the AP control apparatus 108 increases the transmission output of the i-th AP but decreases the transmission output of the (i+1)-th AP. In this way, the present exemplary embodiment appropriately controls the transmission output of each AP with respect to one STA, thus enabling preventing or reducing a decrease in throughput.

Furthermore, while, in FIG. 3, a flow in which the AP control apparatus 108 performs both exclusion of an AP the RSSI of which is less than or equal to the threshold value Pmin1 and control of the transmission output that is based on the threshold value Pmin2 and the threshold value Pmax is illustrated, the present exemplary embodiment is not limited to this. The AP control apparatus 108 can be configured to perform only one of exclusion of an AP the RSSI of which is less than or equal to a predetermined threshold value and control of the transmission output that is based on a predetermined threshold value.

Moreover, in FIG. 3, the AP control apparatus 108 performs both control to increase the transmission output and control to decrease the transmission output as control operations for the transmission output, but can be configured to perform only one of the control operations. Specifically, the AP control apparatus 108 can be configured to perform S309 and S310 without performing S307 and S308 illustrated in FIG. 3. Alternatively, the AP control apparatus 108 can be configured to perform S307 and S308 without performing S309 and S310 illustrated in FIG. 3.

Furthermore, in FIG. 3, in a case where RSSI in a communication between the i-th AP and the n-th STA is less than or equal to the threshold value Pmin2, the AP control apparatus 108 increases the transmission output of the i-th AP. However, in a case where, with respect to the i-th AP, the RSSI is not able to exceed the threshold value Pmin2 unless exceeding the upper limit of the transmission output prescribed in each country, the AP control apparatus 108 can be configured to exclude such an AP from distributed MIMO communication with the n-th STA. In this case, if the determination in S307 is YES, the AP control apparatus 108 further determines whether the changed transmission output exceeds the upper limit of the transmission output prescribed in each country, and, if it is determined that the changed transmission output exceeds such an upper limit, the AP control apparatus 108 performs processing in S306. Moreover, if it is determined that the changed transmission output does not exceed such an upper limit, the AP control apparatus 108 performs processing in S308. In this case, the AP control apparatus 108 can omit the determination in S305. Alternatively, the AP control apparatus 108 can determine the threshold value Pmin1 used in S305 based on the upper limit of the transmission output prescribed in each country and the current transmission output.

Moreover, in FIG. 3, the AP control apparatus 108 controls the transmission output of the i-th AP with respect to the n-th STA, but can be configured to perform control, in addition to that or in place of that, to cause the i-th AP to perform beamforming on the n-th STA. Specifically, if it is determined that the acquired RSSI is less than or equal to the threshold value Pmin2 (YES in S307), the AP control apparatus 108 performs control to cause the i-th AP to perform beamforming on the n-th STA when performing communication with the n-th STA. In this case, the AP control apparatus 108 can acquire RSSI obtained when the i-th AP has performed beamforming on the n-th STA, and, if the acquired RSSI is less than or equal to the threshold value Pmin2, the AP control apparatus 108 can perform control to further increase the transmission output. Moreover, the AP control apparatus 108 can acquire RSSI obtained when the i-th AP has performed beamforming on the n-th STA, and, if the acquired RSSI is greater than or equal to the threshold value Pmax, the AP control apparatus 108 can perform control to decrease the transmission output.

Moreover, while, in the present exemplary embodiment, the AP control apparatus 108 determines the transmission output of each AP which performs distributed MIMO communication, the present exemplary embodiment is not limited to this, and each AP itself can be configured to determine the transmission output thereof when performing distributed MIMO communication. Specifically, each AP can be configured to perform processing in S303 to S311 illustrated in FIG. 3. Moreover, after determining the transmission output thereof in a communication with each STA, each AP further performs processing in S313, thus determining MCS in the communication with each STA. Upon determining the transmission output and MCS with respect to each of all of the STAs which perform distributed MIMO communication, each AP notifies the AP control apparatus 108 of such determination. Upon receiving notifications from all of the APs which perform distributed MIMO communication, the AP control apparatus 108 performs processing in S314, thus starting distributed MIMO communication.

Moreover, in the present exemplary embodiment, the AP control apparatus 108 determines the transmission output based on RSSI. However, the present exemplary embodiment is not limited to this, and the AP control apparatus 108 can select the transmission output based on an SNR in a communication between an AP and an STA which perform distributed MIMO communication. In this case, the AP control apparatus 108 excludes an AP the SNR of which is less than or equal to a predetermined threshold value Rmin1 from distributed MIMO communication, as with RSSI. Moreover, in a case where the SNR is less than or equal to a predetermined threshold value Rmin2, the AP control apparatus 108 increases the transmission output of the AP, and, in a case where the SNR is greater than or equal to a predetermined threshold value Rmax, the AP control apparatus 108 decreases the transmission output of the AP. Furthermore, the magnitude relationship between the respective threshold values is Rmin1<Rmin2<Rmax. In this way, the AP control apparatus 108 determines a transmission output from an AP to an STA based on information about a communication quality of a communication between the AP and the STA, which perform distributed MIMO communication.

Furthermore, the AP control apparatus 108 can acquire RSSI for every predetermined time after distributed MIMO communication is started and can set at least one of a transmission output and MCS which are appropriate for an AP. This enables the AP control apparatus 108 to set a transmission output and MCS which are always appropriate for an AP which performs distributed MIMO communication. In this case, the AP control apparatus 108 can previously store RSSI used for determining the last transmission output or MCS and can determine a new transmission output or MCS when a difference between a new acquired RSSI and the previously stored RSSI has become greater than or equal to a predetermined value. This enables setting a new appropriate transmission output or MCS when RSSI has changed by a predetermined value or more, i.e., when a distance between the AP and the STA has changed by a predetermined distance or more, or when a change such as an increase or decrease in a blocking object between the AP and the STA has occurred.

Furthermore, in a case where, among APs which perform distributed MIMO communication, a plurality of APs has a function serving as the AP control apparatus 108, the APs can perform negotiations as to which AP operates as the AP control apparatus 108. The present negotiations are performed before S301 illustrated in FIG. 3 is started, and an AP determined by the present negotiations to operate as the AP control apparatus 108 performs processing in the flow illustrated in FIG. 3. An AP having the function serving as the AP control apparatus 108 can compare pieces of identification information available for uniquely identifying respective apparatuses and thus determine which AP operates as the AP control apparatus 108. Examples of identification information available for uniquely identifying an apparatus include MAC address, IP address, and UUID. Furthermore, MAC is an abbreviation for media access control, IP is an abbreviation for Internet Protocol, and UUID is an abbreviation for universally unique identifier.

Alternatively, an AP having the function serving as the AP control apparatus 108 can compare pieces of identification information for networks which respective APs establish and thus determine which AP operates as the AP control apparatus 108. Examples of identification information for networks include a service set identifier (SSID) and an extended service set identifier (ESSID). Alternatively, an AP having the function serving as the AP control apparatus 108 can compare predetermined values which respective APs retain and thus determine which AP operates as the AP control apparatus 108. Each predetermined value is a value indicating a degree to which each AP is intended to function as the AP control apparatus 108 in distributed MIMO communication. For example, in a case where an AP retaining the highest predetermined value operates as the AP control apparatus 108, an AP which is higher in performance than other APs retains a higher predetermined value. Furthermore, in a case where an AP retaining the lowest predetermined value operates as the AP control apparatus 108, an AP which is higher in performance than other APs retains a lower predetermined value. The predetermined value can be previously preset in an AP or can be set by the user.

Furthermore, in the present exemplary embodiment, the communication apparatus 103 and the communication apparatus 104, each of which is an AP, are assumed to establish the wireless network 101 and the wireless network 102, respectively. When performing distributed MIMO communication, the communication apparatus 103 and the communication apparatus 104 can set the SSIDs of the wireless network 101 and the wireless network 102 as the same SSID. Alternatively, the communication apparatus 103 and the communication apparatus 104 can set network identifiers, different from SSIDs, of the wireless network 101 and the wireless network 102 as the same identifier. Moreover, when performing distributed MIMO communication, the communication apparatus 103 and the communication apparatus 104 can establish wireless networks for performing distributed MIMO communication in addition to the wireless network 101 and the wireless network 102.

Furthermore, while, in the present exemplary embodiment, the AP control apparatus 108 performs processing in the flow illustrated in FIG. 3 with respect to all of the APs which perform distributed MIMO communication, the present exemplary embodiment is not limited to this. The AP control apparatus 108 only needs to perform processing in the flow illustrated in FIG. 3 with respect to at least two APs and one STA which perform distributed MIMO communication, thus being able to reduce a difference in RSSI in a communication between these APs and STA. For example, the AP control apparatus 108 can be configured to perform processing in the flow illustrated in FIG. 3 with respect to two APs having the largest difference in RSSI in a communication with one given STA.

Furthermore, at least a part of or the whole of the flowcharts for the AP control apparatus 108 illustrated in FIG. 3 and FIG. 4 can be implemented by hardware. In a case where hardware is used for such implementation, for example, a predetermined compiler can be used to generate a dedicated circuit on an FPGA from a computer program for implementing respective operations, and the generated dedicated circuit can be used. FPGA is an abbreviation for field-programmable gate array. Moreover, a gate array circuit can be formed as with an FPGA and be used as hardware for implementation. Moreover, an application specific integrated circuit (ASIC) can be used as hardware for implementation.

While the present exemplary embodiment has been described above in detail, some embodiments can be embodied as, for example, a system, an apparatus, a method, a program, or a recording medium (storage medium). Specifically, some embodiments can be applied to a system composed of a plurality of apparatuses (for example, a host computer, an interface device, an imaging apparatus, and a web application), or can be applied to an apparatus composed of one device.

Some embodiments can also be implemented by processing for supplying a program for implementing one or more functions of the above-described exemplary embodiment to a system or apparatus via a network or a storage medium and causing one or more processors in a computer of the system or apparatus to read out and execute the program. Moreover, some embodiments can also be implemented by a circuit which implements the above one or more functions (for example, an ASIC).

According to some embodiments, a decrease in throughput which may occur when a plurality of apparatuses each having a role of establishing a network performs, in parallel, communication with an apparatus having a role of joining a network can be prevented or reduced. Other Embodiments Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2019-085410, which was filed on Apr. 26, 2019 and which is hereby incorporated by reference herein in its entirety.

What is claimed is:

1. A communication apparatus comprising:
an acquisition unit configured to, in a case where a plurality of apparatuses each having a first role of establishing a wireless network performs, in parallel, communication with a first apparatus having a second role of joining a wireless network via a plurality of transmission channels, acquire first information about a communication quality in communication between a second apparatus included in the plurality of apparatuses and the first apparatus;
a first control unit configured to perform control to decrease a transmission output of the second apparatus when a value indicated by the first information is greater than a first predetermined value, and perform control to increase the transmission output of the second apparatus when the value indicated by the first information is less than a second predetermined value; and
a second control unit configured to perform control in such a manner that the plurality of apparatuses including the second apparatus performing communication using the transmission output controlled by the first control unit performs, in parallel, communication with the first apparatus via the plurality of transmission channels using distributed multi-input and multi-output (MIMO) complying with IEEE 802.11 series standard.

2. The communication apparatus according to claim 1, further comprising a determination unit configured to determine at least one of a coding rate and a modulation scheme for use in communication between the second apparatus and the first apparatus in a case where the transmission output of the second apparatus has been controlled by the first control unit,
wherein the second control unit performs control in such a manner that the plurality of apparatuses including the second apparatus performing communication using the transmission output controlled by the first control unit and the coding rate or the modulation scheme determined by the determination unit performs, in parallel, communication with the first apparatus via the plurality of transmission channels.

3. The communication apparatus according to claim 2, wherein the determination unit determines modulation and coding scheme (MCS) complying with IEEE 802.11 series standards.

4. The communication apparatus according to claim 1,
wherein, in a case where a value about a communication quality indicated by the first information acquired by the acquisition unit is smaller than a third threshold value, the second control unit performs control in such a manner that the plurality of apparatuses excluding the second apparatus performs, in parallel, communication with the first apparatus via the plurality of transmission channels, and
wherein, in a case where the value about a communication quality indicated by the first information is larger than the third threshold value, the second control unit performs control in such a manner that the plurality of apparatuses including the second apparatus performing communication using the transmission output controlled by the first control unit performs, in parallel, communication with the first apparatus via the plurality of transmission channels.

5. The communication apparatus according to claim 1, wherein the first information is received signal strength indication (RSSI) or signal-to-noise ratio (SNR).

6. The communication apparatus according to claim 1, wherein each apparatus having the first role is an access point (AP) in communication complying with IEEE 802.11 series standards, and the first apparatus having the second role is a station (STA) in communication complying with IEEE 802.11 series standards.

7. The communication apparatus according to claim 1, wherein the communication apparatus is included in the plurality of apparatuses.

8. The communication apparatus according to claim 1, wherein the first predetermined value and the second predetemined value are the same value.

9. A control method for a communication apparatus, the control method comprising:
in a case where a plurality of apparatuses each having a first role of establishing a wireless network performs, in parallel, communication with a first apparatus having a second role of joining a wireless network via a plurality of transmission channels, acquiring first information about a communication quality in communication between a second apparatus included in the plurality of apparatuses and the first apparatus; controlling to decrease a transmission output of the second apparatus when a value indicated by the first information is greater than a first predetermined value, and controlling to increase the transmission output of the second apparatus when the value indicated by the first information is less than a second predetermined value; and
performing control in such a manner that the plurality of apparatuses including the second apparatus performing communication using the controlled transmission output performs, in parallel, communication with the first apparatus via the plurality of transmission channels using distributed multi-input and multi-output (MIMO) complying with IEEE 802.11 series standard.

10. A non-transitory computer-readable storage medium storing computer-executable instructions that, when executed by a computer, cause the computer to perform a control method for a communication apparatus, the control method comprising:
in a case where a plurality of apparatuses each having a first role of establishing a wireless network performs, in parallel, communication with a first apparatus having a second role of joining a wireless network via a plurality of transmission channels, acquiring first information about a communication quality in communication between a second apparatus included in the plurality of apparatuses and the first apparatus;
controlling to decrease a transmission output of the second apparatus when a value indicated by the first information is greater than a first predetermined value, and controlling to increase the transmission output of the second apparatus when the value indicated by the first information is less than a second predetermined value; and
performing control in such a manner that the plurality of apparatuses including the second apparatus performing communication using the controlled transmission output performs, in parallel, communication with the first apparatus via the plurality of transmission channels using distributed multi-input and multi-output (MIMO) complying with IEEE 802.11 series standard.

11. A communication method for communicating with a mobile station using two or more base stations of a plurality of base stations, the communication method comprising:
receiving information about a communication quality in communication about a mobile station before using the two or more base stations to communicate with the mobile station via a plurality of transmission channels;
determining, based on the information, transmission power for a first base station and/or a second base station of the plurality of base stations so that a difference between a signal strength at which the mobile station receives a first signal transmitted from the first base station to the mobile station and a signal strength at which the mobile station receives a second signal transmitted from the second base station to the mobile station becomes smaller; and
performing control in such a manner that a communication with the mobile station by the first base station and the second base station is performed using a distributed multi-input and multi-output (MIMO) method based at least on the determined transmission power for the first base station and/or the second base station.

12. The communication method according to claim 11, wherein the communication method is a communication method performed by a control apparatus for controlling the plurality of base stations.

13. The communication method according to claim 12, wherein the plurality of base stations are connected with the control apparatus via a backhaul line.

14. The communication method according to claim 11, further comprising a determination unit configured to determine at least one of a coding rate and a modulation scheme for use in communication from the first base station and/or the second base station to the mobile station based on the information.

* * * * *